(12) United States Patent
Howard

(10) Patent No.: US 12,300,859 B2
(45) Date of Patent: May 13, 2025

(54) ENERGY STORAGE DEVICE

(71) Applicant: Dyson Technology Limited, Wiltshire (GB)

(72) Inventor: Joseph Daniel Howard, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 886 days.

(21) Appl. No.: 17/261,526

(22) PCT Filed: Jul. 19, 2019

(86) PCT No.: PCT/GB2019/052032
§ 371 (c)(1),
(2) Date: Jan. 19, 2021

(87) PCT Pub. No.: WO2020/016601
PCT Pub. Date: Jan. 23, 2020

(65) Prior Publication Data
US 2021/0265641 A1    Aug. 26, 2021

(30) Foreign Application Priority Data
Jul. 20, 2018    (GB) ................................ 1811887

(51) Int. Cl.
*H01M 6/40* (2006.01)
*H01M 6/18* (2006.01)
(Continued)

(52) U.S. Cl.
CPC ............ *H01M 6/40* (2013.01); *H01M 6/18* (2013.01); *H01M 10/0436* (2013.01); *H01M 10/0585* (2013.01); *H01M 50/586* (2021.01)

(58) Field of Classification Search
CPC .... H01M 50/466; H01M 6/40; H01M 50/586; H01M 6/18; H01M 10/0436; H01M 10/0585
See application file for complete search history.

(56) References Cited

U.S. PATENT DOCUMENTS

| | | |
|---|---|---|
| 2006/0035152 A1 | 2/2006 | Nishimura |
| 2007/0139001 A1 | 6/2007 | Hahn |

(Continued)

FOREIGN PATENT DOCUMENTS

| | | |
|---|---|---|
| CN | 101965655 A | 2/2011 |
| CN | 102356493 A | 2/2012 |

(Continued)

OTHER PUBLICATIONS

International Search Report and Written Opinion mailed Oct. 4, 2019, directed to International Application No. PCT/GB2019/052032; 13 pages.

(Continued)

*Primary Examiner* — Milton I Cano
*Assistant Examiner* — Albert Michael Hilton
(74) *Attorney, Agent, or Firm* — Tucker Ellis LLP

(57) ABSTRACT

A method comprising providing a first electrode layer on a first portion of a substrate, providing an electrolyte layer on the first electrode layer, and providing a second electrode layer on the electrolyte layer. At least part of a current collector layer is provided on a second portion of the substrate. An electrically insulating material is deposited on an exposed surface of the first electrode layer and an exposed surface of the electrolyte layer. An electrically conductive material is deposited on the electrically insulating material to connect the second electrode layer to the at least part of the current collector layer.

18 Claims, 5 Drawing Sheets

(51) Int. Cl.
    *H01M 10/04*     (2006.01)
    *H01M 10/0585*     (2010.01)
    *H01M 50/586*     (2021.01)

(56) References Cited

U.S. PATENT DOCUMENTS

| | | |
|---|---|---|
| 2011/0311883 A1* | 12/2011 | Oukassi ............ H01M 6/18 216/13 |
| 2014/0212735 A1 | 7/2014 | Li et al. |
| 2016/0293907 A1 | 10/2016 | Chen et al. |
| 2017/0162854 A1 | 6/2017 | Sugiura |

FOREIGN PATENT DOCUMENTS

| | | | |
|---|---|---|---|
| CN | 105027332 A | | 11/2015 |
| FR | 3 054 727 A1 | | 2/2018 |
| JP | 5426005 B2 | | 2/2014 |
| JP | 6182618 B2 | | 8/2017 |
| WO | 2014/116522 A1 | | 7/2014 |
| WO | 2018/025594 A1 | | 2/2018 |

OTHER PUBLICATIONS

Search Report dated Sep. 18, 2018, directed to GB Application No. 1811887.7; 1 page.

Office Action received for Japanese Patent Application No. 2021-503032, mailed on Jan. 18, 2022, 6 pages (3 pages of English Translation and 3 pages of Original Document).

* cited by examiner

ENERGY STORAGE DEVICE

REFERENCE TO RELATED APPLICATIONS

This application is a national stage application under 35 U.S.C. 371 of International Application No. PCT/GB2019/052032, filed Jul. 19, 2019, which claims the priority of United Kingdom Application No. 1811887.7, filed Jul. 20, 2018, the entire contents of each of which are incorporated herein by reference.

FIELD OF THE DISCLOSURE

The present disclosure relates to methods of manufacturing an energy storage device, an energy storage device and an intermediate structure for manufacture of an energy storage device.

BACKGROUND OF THE DISCLOSURE

Energy storage devices such as solid-state thin film cells may be produced by forming a stack of layers on a substrate. The stack of layers typically includes a first electrode layer, a second electrode layer, and an electrolyte layer between the first electrode layer and the second electrode layer. A combination of the stack and the substrate may then be cut into separate sections to form individual cells.

It is desirable to provide a method of manufacturing an energy storage device that is simpler or more efficient than known manufacturing methods.

SUMMARY OF THE DISCLOSURE

In accordance with some embodiments of the present disclosure, there is provided a method of manufacturing an energy storage device, the method comprising:
  providing a first electrode layer on a first portion of a substrate;
  providing an electrolyte layer on the first electrode layer;
  providing a second electrode layer on the electrolyte layer;
  providing at least part of a current collector layer on a second portion of the substrate;
  depositing an electrically insulating material on an exposed surface of the first electrode layer and an exposed surface of the electrolyte layer; and
  depositing an electrically conductive material on the electrically insulating material to connect the second electrode layer to the at least part of the current collector layer.

Using the electrically conductive material to connect the second electrode layer to the at least part of the current collector layer allows the energy storage device to be connected to an external circuit via the current collector layer. The current collector layer may be deposited in a straightforward manner, for example by coating the substrate with an electrically conductive material to act as the current collector layer.

Deposition of a current collector layer for connecting the second electrode layer to the external circuit is for example easier to control than deposition of other materials. For example, if the electrically conductive material is deposited in the form of an ink, this deposition process may suffer from variation in terms of ink particle size or due to rheology effects (which for example affect the flow of the electrically conductive material and which may cause variations in a quantity or location of the electrically conductive material deposited). Hence, a current collector layer to connect the second electrode layer to the external circuit may be provided using a process which is more easily controllable than if the electrically conductive material was itself used to connect the second electrode layer to the external circuit.

In addition, a smaller quantity of electrically conductive material may be deposited than if an external circuit was connected to the energy storage device via the electrically conductive material itself. This may improve the efficiency of the manufacturing process, for example, by reducing the amount of time taken to manufacture the energy storage device and/or by reducing wastage of materials, such as the electrically conductive material. For example, as a smaller quantity of electrically conductive material may be deposited, the time taken for drying and/or curing of the electrically conductive material (for example if the electrically conductive material is deposited as an ink) may be reduced.

A plurality of cells for the energy storage device may each be manufactured in the same way. In such cases, the current collector layer for each of the plurality of cells may be connected to each other, to connect the plurality of cells in parallel. This allows a multi-cell energy storage device to be manufactured in a simple manner.

In some embodiments, at least part of the current collector layer on the second portion of the substrate is a first portion of the current collector layer and the method comprises providing a second portion of the current collector layer on the first portion of the substrate before providing the first electrode layer on the second portion of the current collector layer, to provide the first electrode layer on the first portion of the substrate.

In these examples, the second portion of the current collector layer may therefore be provided beneath a stack comprising the first electrode layer, the electrolyte layer and the second electrode layer. The first and second portions of the current collector layer may be disconnected or separated from each other, for example, so that the first and second portions of the current collector layer are electrically insulated from each other. This, for example, provides further flexibility for the energy storage device, and reduces the risk of short circuits. For example, the first portion of the current collector layer may also be connected to the external circuit, to connect the first electrode layer to the external circuit. This may further simplify the manufacturing process.

In some embodiments, the first portion of the current collector layer is provided on the first portion of the substrate, the second portion of the current collector layer is provided on the second portion of the substrate, and a third portion of the current collector layer is provided on a third portion of the substrate between the first portion of the substrate and the second portion of the substrate. This, for example, allows the current collector layer to be deposited as a continuous layer, which, for example, covers or overlaps the first, second and third portions of the substrate. This may allow the current collector layer to be deposited simply, with less restrictive requirements on a location of deposition of the current collection layer on the substrate.

In some embodiments, the third portion of the current collector layer is removed to expose the third portion of the substrate after at least one of: providing the first electrode layer on the first portion of the substrate, providing the electrolyte layer on the first electrode layer, or providing the second electrode layer on the electrolyte layer. In this way, the first and second portions of the current collector layer may be electrically disconnected from each other. This, for example, avoids short circuits, which may otherwise occur if the first and second electrode layers are in electrical contact with each other (for example via the current collector layer, after connection of the second electrode layer to the current collector layer using the electrically conductive material). Furthermore, this approach of providing the current collector layer as a layer and removing the third portion of the current collector layer may be more straightforward or easier to implement than other approaches, such as attempting to accurately deposit the current collector layer solely on the second portion of the substrate.

Removing the third portion of the current collector layer may include laser ablating the third portion of the current collector layer. Laser ablation may be performed rapidly and controlled with relative ease, therefore allowing the third portion of the current collector layer to be removed accurately, without removing other portions of the current collector layer.

In some embodiments, the second electrode layer is provided after depositing the electrically insulating material. This for example reduces the risk of the second electrode layer coming into contact with the first electrode layer during deposition, which may cause a short circuit during use of the energy storage device. For example, the electrically insulating material may be deposited to ensure that the first electrode layer is not exposed or is sufficiently insulated before deposition of the second electrode layer. This may also relax the deposition requirements for deposition of the second electrode layer as, if the first electrode layer is already insulated, the deposition accuracy for the second electrode layer may not need to be as precise as otherwise (where the second electrode layer may come into contact with the first electrode layer unless it is deposited very accurately).

In some embodiments, at least one of the electrically insulating material or the electrically conductive material is ink jet printed. Ink jet printing for example allows the electrically insulating material and/or the electrically conductive material to be deposited accurately, reducing the quantity of these materials to be deposited. This may also improve the efficiency of the manufacturing process, by reducing waste of the electrically insulating material and/or the electrically conductive material that may otherwise occur if these materials are deposited using less accurate methods.

In accordance with some embodiments of the present disclosure, there is provided a method comprising:
 providing, on a substrate, a stack for an energy storage device, the stack comprising: a current collector layer;
 a first electrode layer; and
 an electrolyte layer between the current collector layer and the first electrode layer;
 removing a portion of the first electrode layer and a portion of the electrolyte layer to expose a portion of the current collector layer;
 removing part of the portion of the current collector layer to leave a first portion of the current collector layer not overlapped by the first electrode layer and the electrolyte layer and a second portion of the current collector layer overlapped by the first electrode layer and the electrolyte layer;
 depositing an electrically insulating material between the first portion of the current collector layer and the second portion of the current collector layer, and on an exposed surface of the first electrode layer and an exposed surface of the electrolyte layer;
 providing a second electrode layer on the electrolyte layer; and
 depositing an electrically conductive material on the electrically insulating material to connect the second electrode layer to the first portion of the current collector layer.

Some embodiments of the disclosure for example allows an energy storage device to be manufactured more straightforwardly or more efficiently.

In some embodiments, the electrically insulating material is deposited between the first portion of the current collector layer and the second portion of the current collector layer without substantially overlapping the first portion of the current collector layer. With this approach, the electrically insulating material for example has a smaller surface area. This may further improve the efficiency of the manufacturing method by further reducing the quantity of the electrically conductive material to be deposited (as the electrically conductive material is deposited on the electrically insulating material, which for example has a smaller surface area). In addition, the quantity of electrically insulating material may be reduced, which may also improve the efficiency of the method.

In some embodiments, removing the part of the portion of the current collector layer exposes a portion of the substrate. In such examples, the electrically insulating material may be deposited to contact the portion of the substrate. In this way, the electrically insulating material may further reduce the risk of short circuits, by insulating the first portion of the current collector layer (and hence the second electrode layer, which is connected to the first portion of the current collector layer) from the first electrode layer.

In some embodiments, the electrically insulating material is deposited to contact a first part of the portion of the substrate without contacting a second part of the portion of the substrate. As explained above, this may reduce the quantity of electrically insulating material used, and may reduce the surface area of the electrically insulating material on which the electrically conductive material is to be deposited. This may improve the efficiency of the method.

In some embodiments, the electrically conductive material is deposited to contact the second part of the portion of the substrate. This, for example, aids the containment of the electrically conductive material between the electrically insulating material and the edge of the first portion of the current collector layer, improving the connection between the second electrode layer and the first portion of the current collector layer.

In some embodiments, the electrically conductive material is deposited on the electrically insulating material to connect the second electrode layer to the first portion of the current collector layer without the electrically conductive material substantially overlapping the first portion of the current collector layer. In this way, a relatively small quantity of the electrically conductive material may be deposited, rather than depositing a larger quantity of the electrically conductive material to overlap the first portion of the current collector layer.

In some embodiments, at least one of the portion of the first electrode layer, the portion of the electrolyte, or the part of the portion of the current collector layer are removed using laser ablation. As explained above, laser ablation is for example a rapid and easily controllable process, which may improve the overall efficiency of the method.

In accordance with some embodiments of the present disclosure, there is provided an energy storage device comprising:
 a substrate;

a stack on a first portion of the substrate, the stack comprising:
  a first electrode;
  a second electrode, further from the substrate than the first electrode; and
  an electrolyte between the first electrode and the second electrode;
at least part of a current collector on a second portion of the substrate, different from the first portion of the substrate;
an electrically insulating material on an exposed surface of the stack to insulate the first electrode from the second electrode; and
an electrically conductive material on the electrically insulating material to connect the second electrode to the at least part of the current collector.

Some embodiments of the disclosure relate to an energy storage device which may be manufactured more straightforwardly or more efficiently than other energy storage devices.

In some embodiments, the at least part of the current collector on the second portion of the substrate is a first portion of the current collector and the energy storage device comprises a second portion of the current collector on the first portion of the substrate, between the first portion of the substrate and the stack. As explained above, this for example reduces the risk of short circuits. Furthermore, such an energy storage device may be manufactured more straightforwardly.

In some embodiments, the electrically insulating material contacts a third portion of the substrate between the first portion of the substrate and the second portion of the substrate, to insulate the first portion of the current collector from the second portion of the current collector. As explained above, this for example further reduces the risk of short circuits.

In some embodiments, a portion of the second electrode overlaps the electrically insulating material such that the electrically insulating material is at least partly between the portion of the second electrode and the substrate. This for example further reduces the quantity of the electrically conductive material in the energy storage device compared with examples in which the second electrode does not overlap the electrically insulating material. In such cases, the electrically conductive material may overlap the electrically insulating material to contact the second electrode, which may increase the quantity of electrically conductive material required. With the portion of the second electrode overlapping the electrically insulating material, the deposition requirements for the second electrode may be relaxed compared with examples in which the second electrode is deposited such that it is entirely non-overlapping the electrically insulating material. Hence, such an energy storage device may be manufactured more straightforwardly.

In accordance with some embodiments of the present disclosure, there is provided an intermediate structure for manufacture of an energy storage device, the intermediate structure comprising:
a substrate;
a stack on a first portion of the substrate, the stack comprising:
  an electrolyte layer; and
  a first electrode layer between the electrolyte layer and the substrate;
at least part of a current collector layer on a second portion of the substrate, different from the first portion of the substrate, the substrate comprising a third portion not overlapped by each of the stack and the current collector layer, the third portion between the first portion and the second portion.

Some embodiments of the disclosure relate to an intermediate structure for an energy storage device which may be manufactured more straightforwardly or more efficiently.

In some embodiments, the intermediate structure includes an electrically insulating material on at least part of the third portion of the substrate and overlapping less than all of the second portion of the substrate, the electrically insulating material at least partly covering an exposed surface of the first electrode layer. The electrically insulating material for example insulates the first electrode layer, which may reduce the risk of short circuits between the first electrode layer and a second electrode layer (which may be deposited subsequently).

In such examples, there may be substantially no electrically insulating material overlapping the second portion of the substrate. In these examples, the intermediate structure may include a smaller quantity of the electrically insulating material than otherwise, which may allow the intermediate structure to be manufactured more efficiently than otherwise.

In some embodiments, the electrically insulating material is absent from part of the third portion of the substrate. This for example provides a recess into which an electrically conductive material may subsequently be provided, which may simplify the deposition of the electrically conductive material and reduce the amount of electrically conductive material to be deposited.

In some embodiments, the at least part of the current collector layer on the second portion of the substrate is a first portion of the current collector layer and the current collector layer comprises a second portion on the first portion of the substrate, between the first portion of the substrate and the stack. As explained above, this for example reduces the risk of short circuits. Furthermore, such an energy storage device may be manufactured more straightforwardly.

In some embodiments, the stack comprises a second electrode layer, the electrolyte layer between the first electrode layer and the second electrode layer. This for example allows the stack to be used as the energy storage device, for example as a thin-film battery cell.

In some embodiments, a portion of the second electrode layer at least partly overlaps the third portion of the substrate. As explained above, this for example reduces the quantity of the electrically conductive material in the energy storage device (after manufacture) compared with some embodiments in which the second electrode does not overlap the third portion of the substrate. Furthermore, this for example simplifies manufacture of the energy storage device by relaxing deposition requirements for the second electrode layer.

Further features will become apparent from the following description, given by way of example only, which is made with reference to the accompanying drawings.

DETAILED DESCRIPTION OF THE DISCLOSURE

Details of methods, structures and devices according to examples/embodiments will become apparent from the following description, with reference to the Figures. In this description, for the purpose of explanation, numerous specific details of certain examples/embodiments are set forth. Reference in the specification to "an example," "an embodiment," or similar language means that a particular feature, structure, or characteristic described in connection with the example/embodiment is included in at least that one example/embodiment, but not necessarily in other examples/embodiments. It should further be noted that certain examples/embodiments are described schematically with certain features omitted and/or necessarily simplified for ease of explanation and understanding of the concepts underlying the examples/embodiments.

Figure 1:
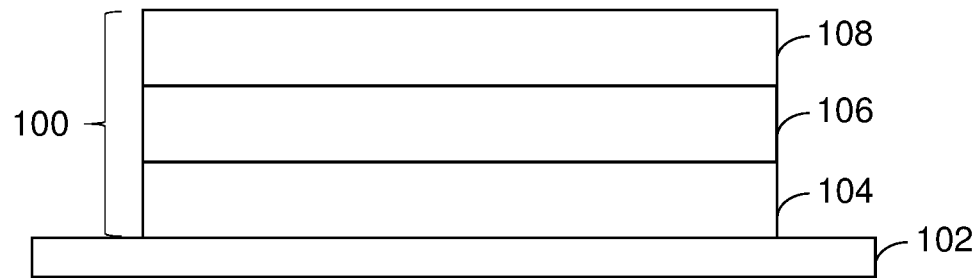
FIG. 1 is a schematic diagram that shows a stack for an energy storage device according to some embodiments.

FIG. 1 shows a stack 100 of layers for an energy storage device. The stack 100 of FIG. 1 may be used as part of a thin-film energy storage device having a solid electrolyte, for example.

The stack 100 is on a substrate 102 in FIG. 1. The substrate 102 is for example glass or polymer and may be rigid or flexible. The substrate 102 is typically planar. Although the stack 100 is shown as directly contacting the substrate 102 in FIG. 1, there may be one or more further layers between the stack 100 and the substrate 102 in other embodiments. Hence, unless otherwise indicated, reference herein to an element being "on" another element is to be understood as including direct or indirect contact. In other words, an element on another element may be either touching the other element, or not in contact the other element but, instead, generally supported by an intervening element (or elements) but nevertheless located above, or overlapping, the other element.

The stack 100 of FIG. 1 includes a first electrode layer 104, an electrolyte layer 106 and a second electrode layer 108. In the example of FIG. 1, the second electrode layer 108 is further from the substrate 102 than the first electrode layer 104, and the electrolyte layer 106 is between the first electrode layer 104 and the second electrode layer 108.

The first electrode layer 104 may act as a positive current collector layer. In such embodiments, the first electrode layer 104 may form a positive electrode layer (which may correspond with a cathode during discharge of a cell of the energy storage device including the stack 100). The first electrode layer 104 may include a material which is suitable for storing lithium ions by virtue of stable chemical reactions, such as lithium cobalt oxide, lithium iron phosphate or alkali metal polysulphide salts.

In alternative embodiments, there may be a separate positive current collector layer, which may be located between the first electrode layer 104 and the substrate 102. In these embodiments, the separate positive current collector layer may include nickel foil, but it is to be appreciated that any suitable metal could be used, such as aluminium, copper or steel, or a metalised material including metalised plastics such as aluminium on polyethylene terephthalate (PET).

The second electrode layer 108 may act as a negative current collector layer. The second electrode layer 108 in such cases may form a negative electrode layer (which may correspond with an anode during discharge of a cell of an energy storage device including the stack 100). The second electrode layer 108 may include a lithium metal, graphite, silicon or indium tin oxide (ITO). As for the first electrode layer 104, in other embodiments, the stack 100 may include a separate negative current collector layer, which may be on the second electrode layer 108, with the second electrode layer 108 between the negative current collector layer and the substrate 102. In some embodiments in which the negative current collector layer is a separate layer, the negative current collector layer may include nickel foil. It is to be appreciated, though, that any suitable metal could be used for the negative current collector layer, such as aluminium, copper or steel, or a metalised material including metalised plastics such as aluminium on polyethylene terephthalate (PET).

The first and second electrode layers 104, 108 are typically electrically conductive. Electrical current may therefore flow through the first and second electrode layers 104, 108 due to the flow of ions or electrons through the first and second electrode layers 104, 108.

The electrolyte layer 106 may include any suitable material which is ionically conductive, but which is also an electrical insulator, such as lithium phosphorous oxynitride (LiPON). As explained above, the electrolyte layer 106 is for example a solid layer, and may be referred to as a fast ion conductor. A solid electrolyte layer may have structure which is intermediate between that of a liquid electrolyte, which for example lacks a regular structure and includes ions which may move freely, and that of a crystalline solid. A crystalline material for example has a regular structure, with an ordered arrangement of atoms, which may be arranged as a two dimensional or three dimensional lattice. Ions of a crystalline material are typically immobile and may therefore be unable to move freely throughout the material.

The stack 100 may for example be manufactured by depositing the first electrode layer 104 on the substrate 102. The electrolyte layer 106 is subsequently deposited on the first electrode layer 104, and the second electrode layer 108 is then deposited on the electrolyte layer 106. Each layer of the stack 100 may be deposited by flood deposition, which provides a simple and effective way of producing a highly homogenous layer, although other deposition methods are possible.

The stack 100 of FIG. 1 may undergo further processing to manufacture an energy storage device. An example of processing that may be applied to the stack 100 of FIG. 1 is illustrated schematically in FIG. 2.

Figure 2:
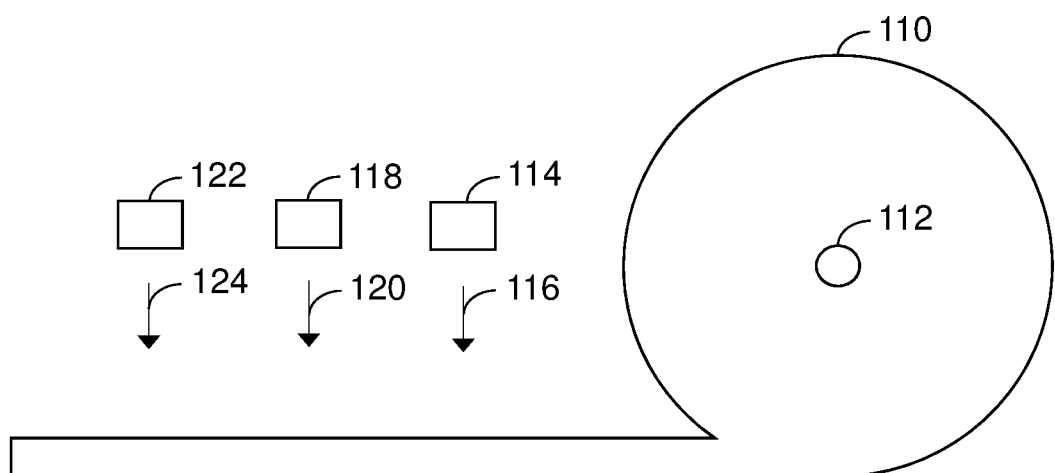
FIG. 2 is a schematic diagram that shows an example of processing the stack of FIG. 1 for manufacture of an energy storage device according to some embodiments.

In FIG. 2, the stack 100 and the substrate 102 together form an intermediate structure 110 for the manufacture of an energy storage device. The intermediate structure 110 in this example is flexible, allowing it to be wound around a roller 112 as part of a roll-to-roll manufacturing process (sometimes referred to as a reel-to-reel manufacturing process). The intermediate structure 110 may be gradually unwound from the roller 112 and subjected to further processing.

In the example of FIG. 2, grooves may be formed through the intermediate structure 110 (for example through the stack 100) using a first laser 114. The first laser 114 is arranged to apply laser beams 116 to the intermediate structure 110 to remove portions of the intermediate structure, thereby forming grooves in the stack 100. This process may be referred to as laser ablation.

After formation of the grooves, electrically insulating material may be deposited in at least some of the grooves using a material deposition system 118. The material deposition system 118 for example fills at least some of the grooves with a liquid 120 such as an organic suspended liquid material. The liquid 120 may then be cured in the grooves to form electrically insulating plugs in the grooves. An electrically insulating material may be considered to be electrically non-conductive and may therefore conduct a relatively a small amount of electric current when subjected to an electric field. Typically, an electrically insulating material (sometimes referred to as an insulator) conducts less electric current than semiconducting materials or electrically conductive materials. However, a small amount of electric current may nevertheless flow through an electrically insulating material under the influence of an electric field, as even an insulator may include a small amount of charge carriers for carrying electric current. In some embodiments herein, a material may be considered to be electrically insulating where it is sufficiently electrically insulating to perform the function of an insulator. This function may be performed for example where the material insulates one element from another sufficiently for short circuits to be avoided.

Referring to FIG. 2, after deposition of the electrically insulating material, the intermediate structure 110 is cut along at least some of the grooves to form separate cells for an energy storage device. In some embodiments such as FIG. 2, hundreds and potentially thousands of cells can be cut from a roll of the intermediate structure 110, allowing multiple cells to be manufactured in an efficient manner.

In FIG. 2, the cutting operation is performed using a second laser 122, which is arranged to apply laser beams 124 to the intermediate structure 110. Each cut may for example be through the centre of an insulating plug such that the plug is split into two pieces, each piece forming a protective covering over exposed surfaces including edges to which it has attached. Cutting through the entire stack in this way creates exposed surfaces of the first and second electrode layers 104, 108.

Although not shown in FIG. 2 (which is merely schematic), it is to be appreciated that, after deposition of the electrically insulating material, the intermediate structure 110 may be folded back on itself, to create a z-fold arrangement having at least ten, possibly hundreds, and potentially thousands, of layers with each of the insulating plugs aligned. The laser cutting process performed by the second laser 122 may then be used to cut through the z-fold arrangement in a single cutting operation for each of the aligned sets of plugs.

After cutting the cells, electrical connectors can be provided along opposite sides of a cell, such that a first electrical connector on one side of the cell contacts the first electrode layer 104 (which may be considered to form a first electrode after the cell has been separated from the remainder of the intermediate structure 110), but is prevented from contacting the other layers by the electrically insulating material. Similarly, a second electrical connector on an opposite side of the cell can be arranged in contact with the second electrode layer 108 (which may be considered to form a second electrode after the cell has been separated from the remainder of the intermediate structure 110), but is prevented from contacting the other layers by the insulating material. The insulating material may therefore reduce the risk of a short circuit between the first and second electrode layers 104, 108 and the other layers in each cell. The first and second electrical connectors may, for example, be a metallic material that is applied to the edges of the stack (or to the edges of the intermediate structure 110) by sputtering. The cells can therefore be joined in parallel simply and easily.

Figure 3:
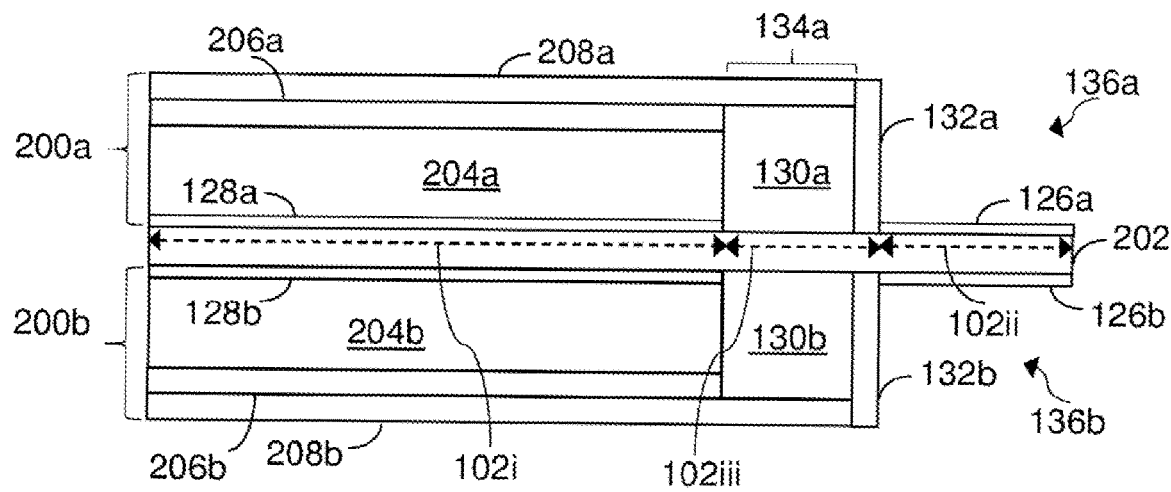
FIG. 3 is a schematic diagram that shows part of an energy storage device according to some embodiments.

FIG. 3 shows schematically part of an energy storage device according to embodiments herein. Corresponding descriptions are to be taken to apply. In the example of FIG. 3, the part of the energy storage device includes a first stack 200a, which is similar to the stack 100 of FIG. 1. Features of the first stack 200a of FIG. 3 which are similar to corresponding features of FIG. 1 are labelled with the same reference numeral incremented by 100 and appended by the letter "a".

The first stack 200a includes a first electrode 204a, an electrolyte 206a, and a second electrode 208a. The electrolyte 206a is between the first electrode 204a and the second electrode 208a. The elements of the first stack 200a of FIG. 3 are shown with different relative widths than the corresponding elements of the stack 100 of FIG. 1. However, this is merely an illustrative example (shown schematically) and other relative widths are possible in other embodiments. The first stack 200a is arranged on a substrate 202, which may be similar to or the same as the substrate 102 of FIG. 1.

The first stack 200a is arranged on a first portion of the substrate 102, with the second electrode layer 208a further from the substrate 102 than the first electrode layer 204a. An extent of the first portion of the substrate 102 is indicated with the reference numeral 102$i$ in FIG. 3. At least part of a current collector (in FIG. 3, a first portion 126a of a current collector) is on a second portion of the substrate 102, different from the first portion of the substrate 102. An extent of the second portion of the substrate 102 is indicated with the reference numeral 102$ii$ in FIG. 3.

In the example of FIG. 3, the energy storage device also includes a second portion 128a of the current collector, which is on the first portion of the substrate 102. However, in some examples, the current collector may be absent from the first portion of the substrate 102. The first stack 200a is arranged on the second portion 128a of the current collector, which, in turn, is on the first portion of the substrate 102. The second portion 128a of the current collector is therefore between the first portion of the substrate 102 and the first stack 200a.

In the example of FIG. 3, the current collector (which includes the first portion 126a and the second portion 128a) may therefore be considered to correspond to a split or disconnected metallised layer on the substrate 202. This may be referred to as a split disconnect, as the first portion 126a of the current collector is disconnected from the second portion 128a of the current collector.

An electrically insulating material 130a is arranged on an exposed surface of the first stack 200a to insulate the first electrode 204a from the second electrode 208a. In this context, an exposed surface of a stack is for example a surface of the stack, which, prior to deposition of the electrically insulating material 130a, is not covered or otherwise in contact with another layer. In this way, the exposed surface of the stack is for example uncovered, revealed or on display prior to deposition of the electrically insulating material 130a.

In some embodiments such as FIG. 3, an exposed surface of a stack such as the first stack 200a may be considered to include five portions prior to deposition of the electrically insulating material 130a: a top portion (which for example corresponds to an upper or top surface of the first stack 200a, such as a surface of the first stack 200a furthest from the substrate 202), and four faces, which for example correspond to short sides of the stack. In FIG. 3, the rightmost face of the stack (which forms part of the exposed surface of the stack) is covered by the electrically insulating material 130*a*. However, in other embodiments, other parts of the exposed surface may be covered by the electrically insulating material 130*a* in addition to or instead of the portion shown in FIG. 3. Furthermore, in other embodiments, the exposed surface may include more or fewer portions than five, which may be of different shapes and/or sizes than the example of FIG. 3.

The electrically insulating material 130*a* may be deposited to partly or entirely cover part (or all) of the exposed surface to insulate the first electrode 204*a* from the second electrode 208*a*, however this may depend on the shape and/or location of the first and second electrodes 204*a*, 208*a*. Typically, the electrically insulating material 130*a* may be considered to insulate the first electrode 204*a* from the second electrode 208*a* where a sufficient quantity of the electrically insulating material 130*a* is deposited in an appropriate location to substantially prevent or limit a flow of current between the first electrode 204*a* and the second electrode 208*a*. This may be the case where the current between the first electrode 204*a* and the second electrode 208*a*, for example during charging or discharging of the energy storage device, is sufficiently small so as to avoid a short circuit between the first electrode 204*a* and the second electrode 208*a*.

In the example of FIG. 3, the electrically insulating material 130*a* contacts a third portion of the substrate 102 between the first portion of the substrate 102 (on which the first stack 200*a* is arranged) and the second portion of the substrate 102 (on which the first portion of the current collector 126*a* is arranged). An extent of the third portion of the substrate 102 is indicated with the reference numeral 102*iii* in FIG. 3. With this arrangement, in addition to insulating the first electrode 204*a* from the second electrode 208*a*, the electrically insulating material 130*a* also insulates the first portion 126*a* of the current collector from the second portion 128*a* of the current collector. In other embodiments, though, the electrically insulating material 130*a* may instead not be in direct contact with the substrate 102. For example, there may be one or more further layers between the electrically insulating material 130*a* and the substrate 102. In yet further examples, an additional insulating material may be used to electrically insulate the first and second portions of the current collector 126*a*, 128*a* from each other (rather than the electrically insulating material 130*a*). However, the energy storage device may be manufactured more efficiently if the electrically insulating material 130*a* is used to both insulate the first and second electrodes 204*a*, 208*a* from each other, and to insulate the first and second portions of the current collector 126*a*, 128*a* from each other.

In some embodiments, the electrically insulating material 130*a* may overlap less than all of the second portion of the substrate 102. In the energy storage device of FIG. 3, there is substantially no electrically insulating material 130*a* overlapping the second portion of the substrate 102. For example, at least 75%, 80%, 85%, 90% or 95% of the second portion of the substrate 102 may not be overlapped by the electrically insulating material 130*a*. In this way, most or all of the second portion of the substrate 102 may be exposed for contact by an electrically conductive material 132*a* (discussed further hereafter).

An electrically conductive material 132*a* is arranged on the electrically insulating material 130*a* to connect the second electrode 208*a* to the at least part of the current collector (in this example, to the first portion 126*a* of the current collector). In some embodiments such as FIG. 3, the electrically conductive material 132*a* may cover or contact at least part of an exposed surface of the electrically insulating material 130*a*. The electrically conductive material 132*a* may be deposited as a relatively thin layer, which is nevertheless sufficiently thick to conduct current from the second electrode 208*a* to the first portion 126*a* of the current collector without interrupting a flow of the current during normal use of the energy storage device (for example, without melting).

As can be seen from FIG. 3, the electrically conductive material 132*a* may be provided as a relatively thin layer of material, along an edge of the first stack 200*a*. For example, the electrically conductive material 132*a* may be elongate along an exposed face of the first stack 200*a* (for example such that the electrically conductive material 132*a* extends along a length of the first stack 200*a*, such as in a direction parallel to a plane of the substrate 202). The electrically conductive material 132*a* may also or instead extend in a direction perpendicular to or substantially perpendicular to a plane of the substrate 202, so as to connect the second electrode 208*a* to the first portion 126*a* of the current collector. A direction may be considered to be substantially perpendicular to a plane where the direction is approximately perpendicular to the plane, such as within measurement tolerances or with an angular deviation of within plus or minus 5, 10 or 20 degrees from perpendicular.

In such cases, the quantity of electrically conductive material 132*a* in the energy storage device may be relatively small compared with other arrangements. As an example, the electrically conductive material 132*a* may be arranged to extend to entirely overlap the second portion of the substrate 102, for example so it is accessible to an electrical connector extending along an edge of the substrate 102, in a direction perpendicular to a plane of the substrate 102. However, in such cases the energy storage device may include a larger amount of electrically conductive material 132*a* than in examples such as FIG. 3, which may cause the energy storage device to be less efficient to manufacture.

For example, in some cases (such as that of FIG. 3), the electrically conductive material 132*a* may not overlap the first portion 126*a* of the current collector. In such cases, the electrically conductive material 132*a* may instead be next to, or may contact a side of, the first portion 126*a* of the current collector, rather than being generally supported by or on top of the first portion 126*a* of the current collector. This may further reduce the amount of electrically conductive material 132*a* for manufacture of the energy storage device.

In some embodiments such as FIG. 3, the electrically insulating material 130*a* may contact or overlap a portion of the third portion of the substrate 102 without contacting an entirety of the third portion of the substrate 102. This is shown in FIG. 3, in which the electrically insulating material 130*a* is absent from part of the third portion of the substrate 102. This therefore provides the substrate 102 with an uneven or non-planar surface (prior to deposition of the electrically conductive material 132*a*). For example, the substrate 102 may include a recess into which the electrically conductive material 132*a* may be deposited. One wall or side of the recess may be formed by a side of the first portion 126*a* of the current collector and an opposite side of the recess may be formed by the electrically insulating material 130*a*. Such a recess may help to retain the electrically conductive material 132*a* during manufacture of the energy storage device, and may help to reduce flow of the electrically conductive material 132*a* onto the first portion 126a of the current collector during deposition. This may further reduce the quantity of electrically conductive material 132a deposited, further improving the efficiency of manufacturing the energy storage device.

A portion 134a of the second electrode 208a overlaps the electrically insulating material 130a in the example of FIG. 3. With an arrangement such as this, the electrically insulating material 130a may be at least partly between the portion 134a of the second electrode 208a and the substrate 102. As can be seen from FIG. 3, with this arrangement, a side of the second electrode 208a may be substantially aligned with a side of the electrically insulating material 130a, for example forming a substantially planar exposed surface of the first stack 200a (in a direction substantially perpendicular to a plane of the substrate 102) after deposition of the electrically insulating material 130a and the second electrode 208a. The electrically conductive material 132a may then be deposited on the electrically insulating material 130a, to connect the portion 134a of the second electrode 208a to the first portion 126a of the current collector. A smaller quantity of electrically conductive material 132a may be used than in other examples in which the second electrode 208a does not overlap the electrically insulating material 130a, and in which a side of the second electrode 208a may be recessed or removed from the side of the electrically insulating material 130a on which the electrically conductive material 132a is deposited.

In such cases, the portion 134a of the second electrode 208a may at least partly overlap the third portion of the substrate 102. For example, the portion 134a of the second electrode 208a may overlap substantially the same part of the third portion of the substrate 102 that is overlapped by the electrically insulating material 130a. As already explained, this for example reduces the quantity of electrically conductive material 132a in the energy storage device.

A combination of the first stack 200a, the electrically insulating material 130a, the electrically conductive material 132a and the first portion 126a of the current collector may be considered to correspond to a first cell 136a for an energy storage device. An energy storage device typically includes a plurality of cells, though.

For example, as shown in FIG. 3, there may be a second cell 136b located on a second side of the substrate 102, opposite to a first side of the substrate 102 on which the first cell 136a is arranged. In the example of FIG. 3, the first and second cell 136a, 136b are otherwise identical to each other. Features of the second cell 136b are labelled with the same reference numeral as corresponding features of the first cell 136a, but appended by the letter "b" rather than the letter "a". Corresponding descriptions are to be taken to apply. However, in other examples, cells on one side of a substrate may differ from cells on an opposite side of the substrate.

In some examples, a plurality of the first cell 136a may be manufactured on the first side of the substrate 202 and a plurality of the second cell 136b may be manufactured on the second side of the substrate 202, for example as part of a roll-to-roll manufacturing process. In such cases, the substrate 202 may be folded so as to stack a plurality of cells on top of each other. This therefore allows an energy storage device including a plurality of cells to be produced.

Figure 4:
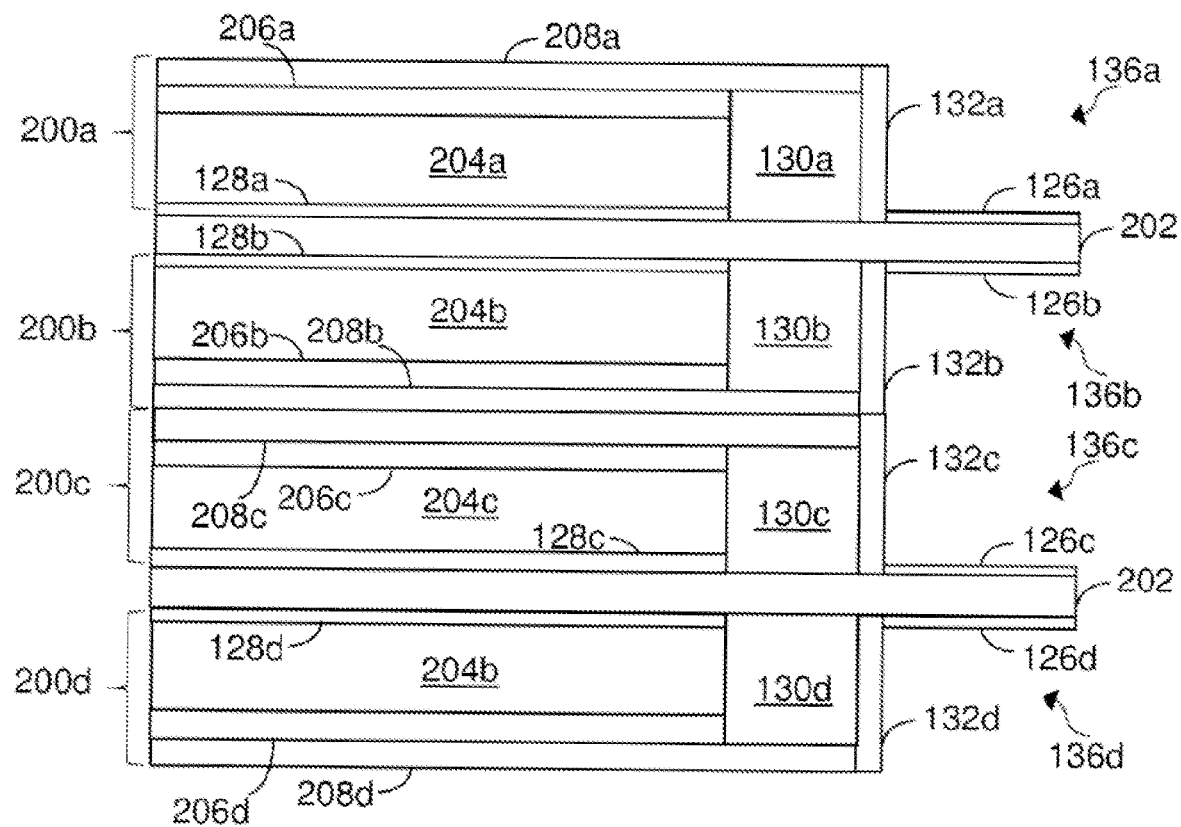
FIG. 4 is a schematic diagram that shows a plurality of electrically connected cells of an energy storage device according to some embodiments.

FIG. 4 shows an example of a plurality of electrically connected cells of an energy storage device. The cells illustrated in FIG. 4 include the first cell 136a and the second cell 136b of FIG. 3, as well as third and fourth cells 136c, 136d. The third and fourth cells 136c, 136d may be the same as the first and second cells 136a, 136b but may have been provided on a different location on the substrate 202, before folding the substrate 202 to provide the stacked structure shown in FIG. 4. Features of FIG. 4 similar to corresponding features of FIG. 3 are labelled with the same reference numeral; corresponding descriptions are to be taken to apply. Some features shown in FIG. 3 are not labelled in FIG. 4, for clarity. Furthermore, features of the third and fourth cells 136c, 136d are labelled with the same reference numerals as corresponding features of the first cell 136a, but appended by the letters "c" or "d", respectively, rather than the letter "a".

As can be seen in FIG. 4, the substrate 202 for example insulates elements of the first cell 136a from elements of the second cell 136b. Similarly, the substrate 202 (which is for example a different portion of the same substrate 202 as that between the first and second cells 136a, 126b) also insulates the third cell 136c from the fourth cell 136d. However, the second electrode 208b of the second cell 136b is in contact with the second electrode of the third cell 136c. Similarly, the electrically conductive material 132b of the second cell 136b is in contact with the electrically conductive material 132c of the third cell 136c. In this way, the second and third cells 136b, 136c are electrically connected with each other. The first cell 136a may be electrically connected with the second cell 136b by electrically connecting the first portion 126a, 126b of the current collector of the first and second cells 136a, 136b. Similarly, the third cell 136c may be electrically connected with the fourth cell 136d by electrically connecting the first portion 126c, 126d of the current collector of the first and second cells 136c, 136d. This may be performed straightforwardly for example by arranging an electrical connector between the first portion 126a, 126b of the current collector of the first and second cells 136a, 136b and an electrical connector between the first portion 126c, 126d of the current collector of the first and second cells 136c, 136d. For example, a single electrical connector may be arranged along a side of the stacked structure of FIG. 4, to connect the first portions 126a-126d of the current collector of each of the cells 136a-136d, together. In this way, the second electrodes 208a-208d of each of the cells 136a-136d may be connected together. Where the second electrodes 208a-208d are negative electrodes, which for example correspond with anodes during discharge of the cells 136a-136d, each of the anodes may thereby be connected together by the electrical connector. The electrical connector may therefore provide a contact point for a first terminal of the energy storage device, which is for example a positive terminal of the energy storage device.

It is to be appreciated that a similar procedure may be performed on the opposite side of the cells 136a-136d, in order to electrically connect each of the first electrodes 204a-204d together using an electrical connector to provide a contact point for a second terminal of the energy storage device, which is for example a negative terminal of the energy storage device. Hence, in effect the cells 136a-136d may be connected in parallel. The positive and negative terminals may be electrically connected across a load to power the load, thereby providing a multi-cell energy storage device. Such a multi-cell energy storage device may be manufactured in a simple manner, as it is for example straightforward to provide an electrical connector to contact a metallic layer (such as the first portion 126a-126d of the current collector for each of the cells 136a-136d).

FIG. 5 (which includes FIGS. 5a to 5h) shows schematically an example of manufacturing the first cell 136a of FIGS. 3 and 4. It is to be appreciated, though, that methods in accordance with FIG. 5 may also be used to manufacture different cells or energy storage devices than those of FIGS.

3 and 4. Features of FIG. 5 which are the same as corresponding features of FIGS. 3 and 4 are labelled with the same reference numerals. Corresponding descriptions are to be taken to apply.

Figure 5A:
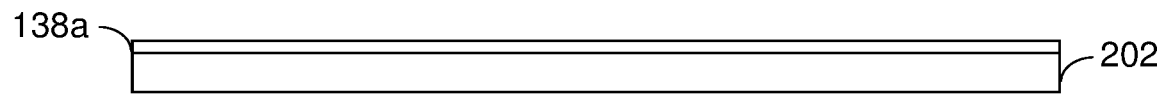
FIG. 5 is a schematic diagram that shows features of a method of manufacturing an energy storage device according to some embodiments.

In FIG. 5a, a substrate 202 is provided. A current collector layer 138a is provided on the substrate 202, for example by sputtering. For example, the current collector layer 138a may be considered to correspond to a metallic layer, which may entirely cover the substrate 202, or may instead cover a portion of the substrate 202. The current collector layer 138a may provide a contact for a terminal of a cell to be manufactured, as described further below.

Figure 5B:
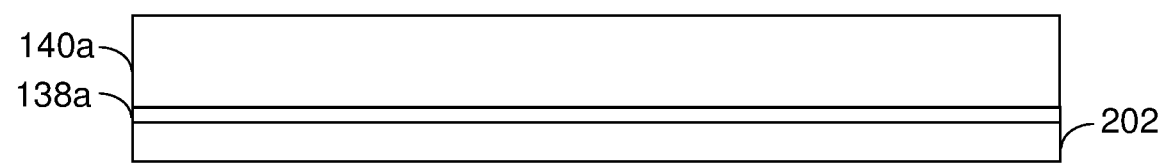

In FIG. 5b, a first electrode layer 140a is provided on the current collector layer 138a. The first electrode layer 140a may be provided for example by a vapour deposition process such as physical vapour deposition (PVD) or chemical vapour deposition (CVD), or by a coating process for use with a roll-to-roll system such as slot die coating (sometimes referred to as slit coating).

Figure 5C:
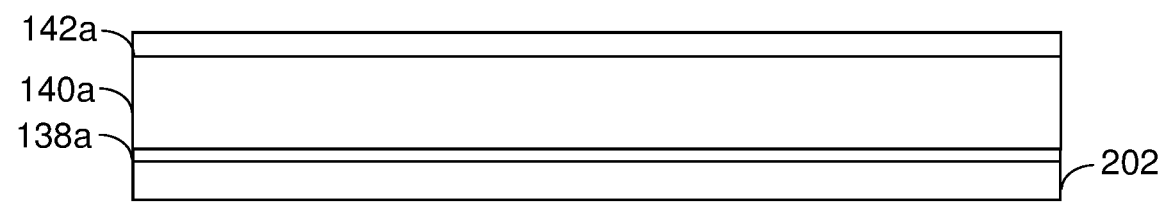

In FIG. 5c, an electrolyte layer 142a is provided on the first electrode layer 140a. As for the providing of the first electrode layer 140a, the electrolyte layer 142a may be provided by a vapour deposition or coating process.

Although in FIG. 5, the current collector layer 138a, the first electrode layer 140a and the electrolyte layer 142a are provided sequentially, in other examples, the substrate 202 may be provided partially assembled. For example, a stack including the current collector layer 138a, the first electrode layer 140a and the electrolyte layer 142a (or a subset of these layers) may already be arranged on the substrate 202 before the substrate 202 is provided). In other examples, the providing of the current collector layer 138a, the first electrode layer 140a and the electrolyte layer 142a on the substrate 202 may be considered to correspond with providing a stack including these layers, which stack may be provided on the substrate 202.

Figure 5D:
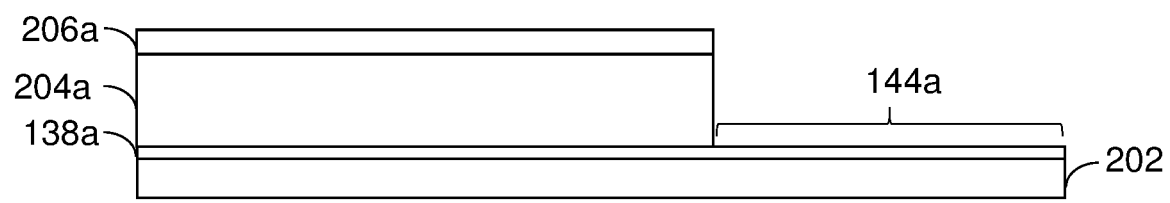

In FIG. 5d, a portion of the first electrode layer 140a and a portion of the electrolyte layer 142a are removed. In this example, after removal of the portion of the first electrode layer 140a, the first electrode 204a of FIGS. 3 and 4 remains. Similarly, after removal of the portion of the electrolyte layer 142a is removed, the electrolyte 206 of FIGS. 3 and 4 remains. The portions of the first electrode layer 140a and the electrolyte layer 142a may be removed for example using laser ablation, in which a surface of the portions of the first electrode layer 140a and the electrolyte layer 142a to be removed is irradiated with a laser beam. This for example causes the portions of the first electrode layer 140a and the electrolyte layer 142a to evaporate, sublimate or be converted to a plasma, and therefore be removed. The amount of the first electrode layer 140a and the electrolyte layer 142a removed by laser ablation may be controlled by controlling properties of the laser beam such as the wavelength of the laser beam or a pulse length of a pulsed laser beam. Laser ablation typically allows the removal of the portions of the first electrode layer 140a and the electrolyte layer 142a to be controlled in a straightforward and rapid manner. However, in other examples, alternative methods may be used to remove the portions of the first electrode layer 140a and the electrolyte layer 142a, such as photolithographic techniques. By removing the portions of the first electrode layer 140a and the electrolyte layer 142a, a portion 144a of the current collector layer 138a is exposed, as shown in FIG. 5d.

Figure 5E:
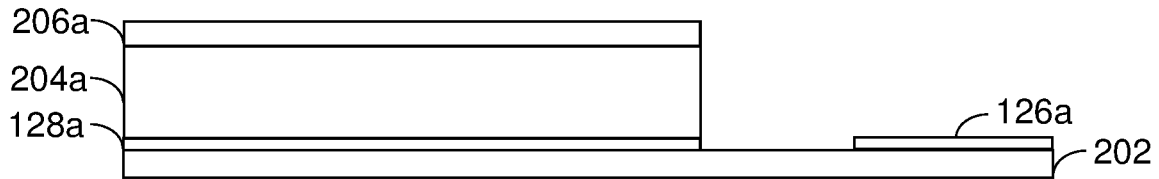

Referring now to FIG. 5e, part of the portion 144a of the current collector layer 138a is removed to leave a first portion 126a of the current collector layer 138a (which is the first portion 126a of the current collector as shown in FIGS. 3 and 4). The first portion 126a of the current collector layer 138a is not overlapped by the first electrode layer or the electrolyte layer (and hence is not overlapped by the first electrode 204a and the electrolyte 206a after removal of the portions of the first electrode layer and the electrolyte layer). However, a second portion 128a of the current collector layer 138a (which is the second portion 128a of the current collector as shown in FIGS. 3 and 4) remains, which is overlapped by the first electrode layer and the electrolyte layer (by the first electrode 204a and the electrolyte 206a, as shown in FIG. 5e). The part of the portion 144a of the current collector layer 138a may be removed in a similar manner to removal of the portions of the first electrode layer and the electrolyte layer, for example using laser ablation or another technique.

The structure illustrated in FIG. 5e may be considered to correspond to an intermediate structure for manufacture of an energy storage device. Such a structure for example includes the substrate 202 and a stack on the first portion of the substrate, the stack including the electrolyte 206a and the first electrode 204a between the electrolyte 206a and the substrate 202. There is at least part of a current collector layer (the first portion 126a) on a second portion of the substrate 202, which is different from the first portion on which the stack is arranged. The substrate 202 also includes a third portion which is not overlapped by either the stack or the current collector layer. The third portion is between the first portion and the second portion and for example separates the first and second portions from each other. Such an intermediate structure may subsequently undergo the processing described with reference to FIGS. 5f to 5g, or other processing to produce an energy storage device.

Figure 5F:
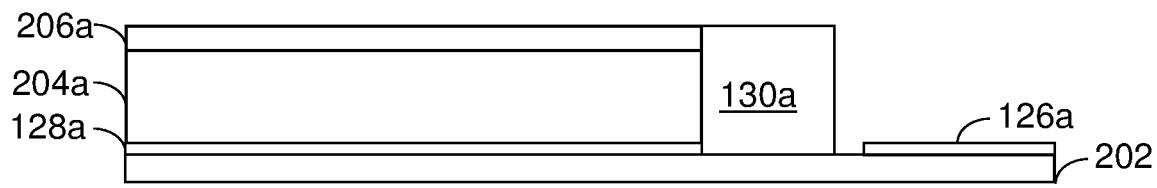

In FIG. 5f, an electrically insulating material 130a is deposited between the first portion 126a of the current collector layer and the second portion 128a of the current collector layer. The electrically insulating material 130a may be deposited using ink jet printing, which for example allows the electrically insulating material 130a to be deposited accurately and precisely. The electrically insulating material 130 is deposited on an exposed surface of the first electrode 204a and an exposed surface of the electrolyte 206a, as explained above with reference to FIG. 3.

In some embodiments such as FIG. 5f, the electrically insulating material 130a may be deposited between the first portion 126a of the current collector layer and the second portion 128a of the current collector layer without substantially overlapping the first portion 126a of the current collector layer. This may for example be performed using a sufficiently precise deposition process, such as ink jet printing. Moreover, as explained above with reference to FIG. 3, this may reduce the amount of electrically conductive material to be deposited at a later stage in the manufacturing process.

Figure 5G:
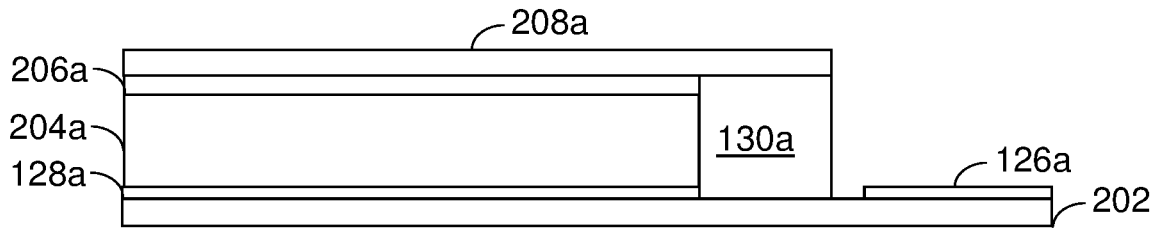
Figure 5H:
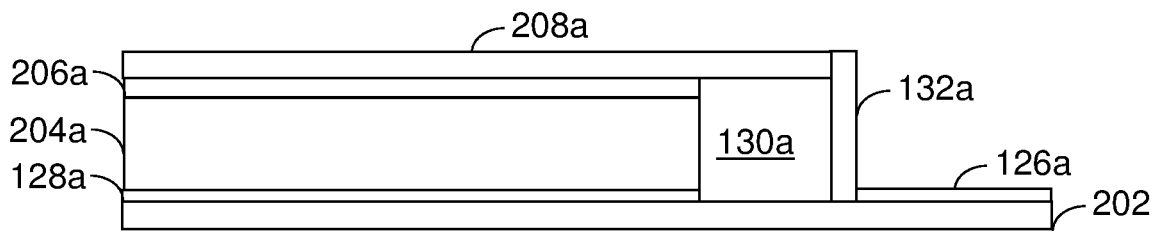

In FIG. 5f, the electrically insulating material 130a is deposited to contact a portion of the substrate 202 which is exposed upon removal of the part of the portion 144a of the current collector layer 138a (as shown in FIG. 5h). In this way, the electrically insulating material 130a insulates the first and second portions 126a, 128a of the current collector layer from each other.

As explained above with reference to FIG. 3, and as shown in FIG. 5, the electrically insulating material 130a may be deposited to contact a first part of the portion of the substrate 202 (which is exposed upon removal of the part of the portion 144a of the current collector layer 138a). This may leave a second portion of the portion of the substrate 202, on which the electrically conductive material 132a may be deposited subsequently.

In FIG. 5g, a second electrode layer (which for example corresponds with the second electrode 208a of FIGS. 3 and 4) is provided on the electrode 206a. The second electrode 208a may be provided similarly to the first electrode layer, for example by a vapour deposition or coating process.

In FIG. 5f, an electrically conductive material 132a is deposited on the electrically insulating material 130a to connect the second electrode 208a to the first portion 126a of the current collector layer. The electrically conductive material 132a may be deposited using an ink jet process, although other deposition processes are possible. As explained above with reference to FIG. 3, the electrically conductive material 132a may be deposited to connect the second electrode 208a to the first portion 126a of the current collector layer without the electrically conductive material 132a substantially overlapping the first portion 126a of the current collector layer, to further reduce an amount of electrically conductive material deposited during the method of FIG. 5.

FIG. 5 provides an example of manufacturing an energy storage device. However, it is to be appreciated that the methods described herein may be used to manufacture different energy storage devices or may be adapted or altered while nevertheless providing the effects described with reference to FIG. 5.

Figure 6:
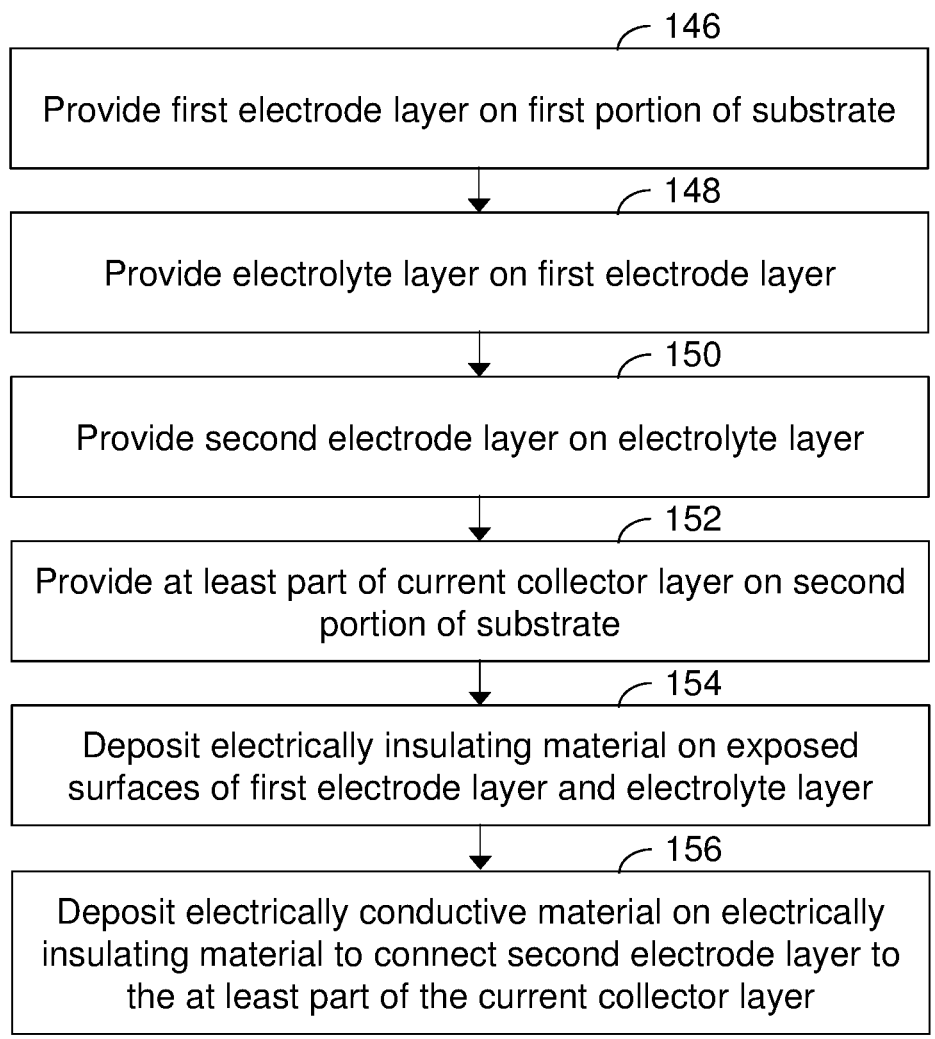
FIG. 6 is a flow diagram illustrating a method of manufacturing an energy storage device according to further examples.

FIG. 6 is a flow-chart summarising a further example method of manufacturing an energy storage device. At item 146 of FIG. 6, a first electrode layer is provided on a first portion of a substrate. The first electrode layer and the substrate may be similar to the first electrode layer 204a, and may be provided similarly. The substrate may be similar to the substrate 202 described above. However, in some cases a current collector layer may not be arranged on the substrate prior to provision of the first electrode layer (or the current collector layer may not be on a first portion of the substrate on which the first electrode layer is provided).

At item 148 of FIG. 6, an electrolyte layer is provided on the first electrode layer. The electrolyte layer may also be similar to the electrolyte layer 206 described above, and may also be provided similarly.

At item 150 of FIG. 6, a second electrode layer is provided on the electrolyte layer. The second electrode layer may be similar to the second electrode layer 208a described above. However, while the second electrode layer 208a of FIG. 5 is provided after an electrically insulating material is deposited, in the method of FIG. 6, the second electrode layer may be provided either before or after provision of an electrically insulating material.

At item 152 of FIG. 6, at least a part of a current collector layer is provided on a second portion of the substrate. The second portion of the substrate is for example different from the first portion of the substrate and may not be overlapped by the first electrode layer, the electrolyte layer and/or the second electrode layer. The substrate may also include a third portion which is between the first and second portions, or the first and second portions may be contiguous or touching. The current collector layer may be similar to the current collector layer 138a described above, and may be provided similarly. However, the current collector layer may be provided solely on the second portion of the substrate rather than on a first and second portion of the substrate. The current collector layer in this example may be provided before or after any of the first electrode layer, the electrolyte layer or the second electrode layer are provided.

In some cases, the method of FIG. 6 may be similar to that of FIG. 5 and may include providing a first portion of the current collector layer on the second portion of the substrate and providing a second portion of the current collector layer on the first portion of the substrate before providing the first electrode layer on the second portion of the current collector layer. In these cases, providing the current collector layer on the substrate may include providing the first portion of the current collector layer on the second portion of the substrate, the second portion of the current collector layer on the first portion of the substrate and a third portion of the current collector layer on a third portion of the substrate between the first and second portions of the substrate. For example, the current collector layer may be provided as a continuous layer which covers the first, second and third portions of the substrate. The third portion of the current collector layer may be removed after providing at least one of the first electrode layer, the electrolyte layer or the second electrode layer, to expose the third portion of the substrate. For example, the third portion of the current collector layer may be removed by laser ablation, as described above.

At item 154 of FIG. 6, an electrically insulating material is deposited on an exposed surface of the first electrode layer and an exposed surface of the electrolyte layer. The electrically insulating material may be deposited before the second electrode layer is provided on the electrolyte layer (as shown in FIG. 5), or after.

At item 156 of FIG. 6, an electrically conductive material is deposited on the electrically insulating material to connect the second electrode layer to the at least part of the current collector layer. The electrically conductive material may be deposited as described above with reference to FIG. 5.

The above examples are to be understood as illustrative examples. Further examples are envisaged.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. An energy storage device comprising:
   a substrate;
   a stack on a first portion of the substrate, the stack comprising:
   a first electrode;
   a second electrode, further from the substrate than the first electrode; and
   an electrolyte between the first electrode and the second electrode;
   at least part of a current collector on a second portion of the substrate, different from the first portion of the substrate;
   an electrically insulating material on an exposed surface of the stack to insulate the first electrode from the second electrode; and
   an electrically conductive material on the electrically insulating material to connect the second electrode to the at least part of the current collector, wherein an entirety of the electrically conductive material extends substantially perpendicular to the substrate, wherein the electrically conductive material does not extend beyond a level of the second electrode.

2. The energy storage device of claim 1, wherein the at least part of the current collector on the second portion of the substrate is a first portion of the current collector and the energy storage device comprises a second portion of the current collector on the first portion of the substrate, between the first portion of the substrate and the stack.

3. The energy storage device of claim 2, wherein the electrically insulating material contacts a third portion of the substrate between the first portion of the substrate and the second portion of the substrate, to insulate the first portion of the current collector from the second portion of the current collector.

4. The energy storage device of claim 1, wherein a portion of the second electrode overlaps the electrically insulating material such that the electrically insulating material is at least partly between the portion of the second electrode and the substrate.

5. A method of manufacturing the energy storage device of claim 1, the method comprising:
provided a first electrode layer on a first portion of a substrate;
providing an electrolyte layer on the first electrode layer;
providing a second electrode layer on the electrolyte layer;
providing at least part of a current collector layer on a second portion of the substrate;
depositing an electrically insulating material on an exposed surface of the first electrode layer and an exposed surface of the electrolyte layer; and
depositing an electrically conductive material on the electrically insulating material to connect the second electrode layer to the at least part of the current collector layer.

6. The method of claim 5, wherein the at least part of the current collector layer on the second portion of the substrate is a first portion of the current collector layer and the method comprises:
providing a second portion of the current collector layer on the first portion of the substrate before providing the first electrode layer on the second portion of the current collector layer, to provide the first electrode layer on the first portion of the substrate.

7. The method of claim 6, comprising providing the current collector layer on the substrate, comprising: providing the first portion of the current collector layer on the second portion of the substrate;
providing the second portion of the current collector layer on the first portion of the substrate; and providing a third portion of the current collector layer on a third portion of the substrate between the first portion of the substrate and the second portion of the substrate.

8. The method of claim 7, comprising, after at least one of: providing the first electrode layer on the first portion of the substrate, providing the electrolyte layer on the first electrode layer, or providing the second electrode layer on the electrolyte layer:
removing the third portion of the current collector layer to expose the third portion of the substrate.

9. The method of claim 8, wherein removing the third portion of the current collector layer comprises laser ablating the third portion of the current collector layer.

10. The method of claim 5, wherein providing the second electrode layer is performed after depositing the electrically insulating material.

11. The method of claim 5, wherein at least one of:
depositing the electrically insulating material comprises ink jet printing the electrically insulating material; or
depositing the electrically conductive material comprises ink jet printing the electrically conductive material.

12. A method comprising:
providing, on a substrate, a stack for the energy storage device of claim 1, the stack comprising:
a current collector layer;
an electrolyte layer; and
a first electrode layer between the current collector layer and the electrolyte layer;
removing a portion of the first electrode layer and a portion of the electrolyte layer to expose a portion of the current collector layer;
removing part of the portion of the current collector layer to leave a first portion of the current collector layer not overlapped by the first electrode layer and the electrolyte layer and a second portion of the current collector layer overlapped by the first electrode layer and the electrolyte layer;
depositing an electrically insulating material between the first portion of the current collector layer and the second portion of the current collector layer, and on an exposed surface of the first electrode layer and an exposed surface of the electrolyte layer;
providing a second electrode layer on the electrolyte layer; and
depositing an electrically conductive material on the electrically insulating material to connect the second electrode layer to the first portion of the current collector layer.

13. The method of claim 12, wherein depositing the electrically insulating material comprises depositing the electrically insulating material between the first portion of the current collector layer and the second portion of the current collector layer without overlapping the first portion of the current collector layer.

14. The method of claim 12, wherein removing the part of the portion of the current collector layer exposes a portion of the substrate, and depositing the electrically insulating material comprises depositing the electrically insulating material to contact the portion of the substrate.

15. The method of claim 14, wherein depositing the electrically insulating material comprises depositing the electrically insulating material to contact a first part of the portion of the substrate without contacting a second part of the portion of the substrate.

16. The method of claim 15, wherein depositing the electrically conductive material comprises depositing the electrically conductive material to contact the second part of the portion of the substrate.

17. The method of claim 12, wherein depositing the electrically conductive material comprises depositing the electrically conductive material on the electrically insulating material to connect the second electrode layer to the first portion of the current collector layer without the electrically conductive material overlapping the first portion of the current collector layer.

18. The method of claim 12, wherein at least one of:
removing the portion of the first electrode layer and the portion of the electrolyte layer comprises laser ablating the portion of the first electrode layer and laser ablating the portion of the electrolyte layer; or
removing the part of the portion of the current collector layer comprises laser ablating the part of the portion of the current collector layer.

* * * * *